Oct. 9, 1962 W. C. THOBURN 3,058,060
METHOD AND MEANS FOR MEASURING MAGNETIC FIELDS
Filed Dec. 22, 1958
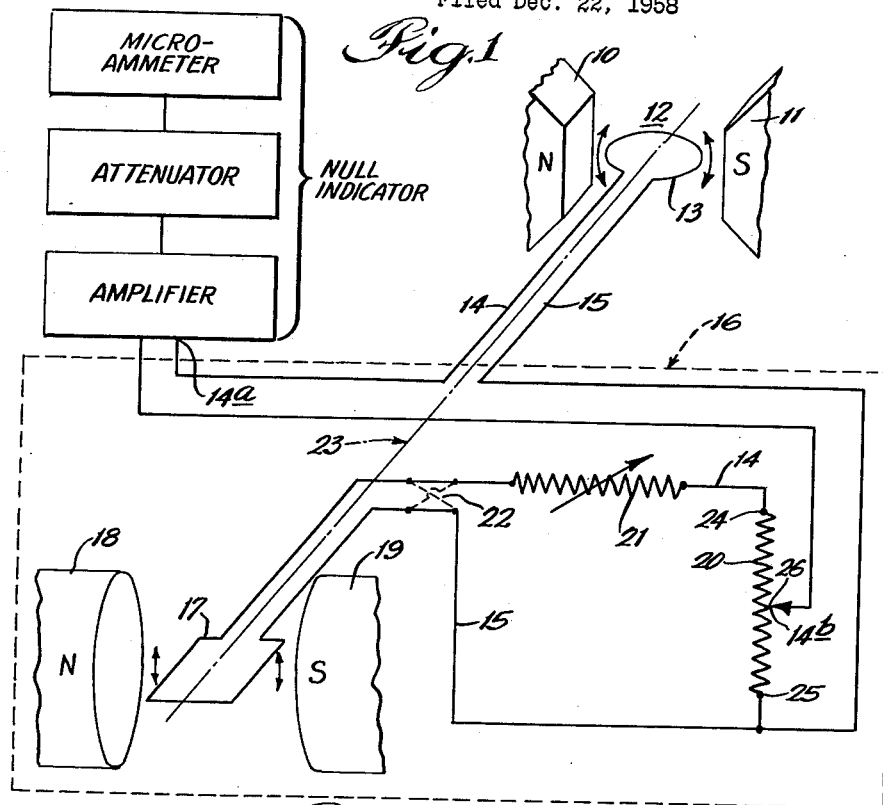
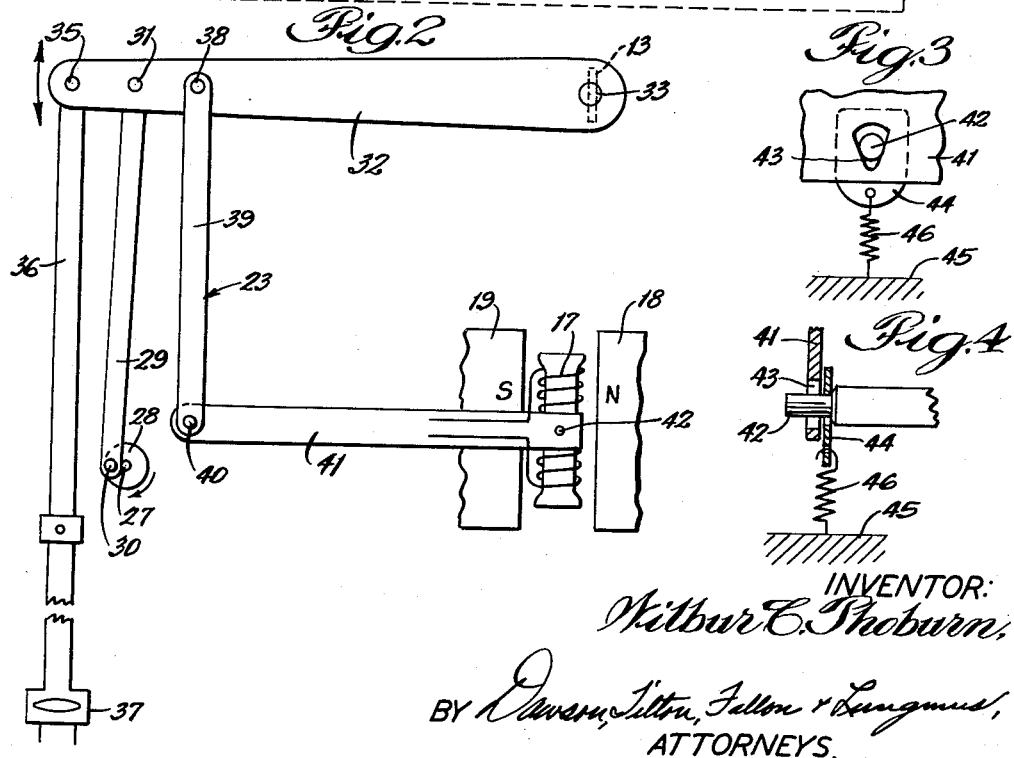
INVENTOR:
Wilbur C. Thoburn,
BY Dawson, Tilton, Fallon & Lungmus,
ATTORNEYS.

United States Patent Office 3,058,060
Patented Oct. 9, 1962

3,058,060
METHOD AND MEANS FOR MEASURING MAGNETIC FIELDS
Wilbur C. Thoburn, Lahore, Pakistan, assignor to Iowa State College Research Foundation, Inc., Ames, Iowa, a corporation of Iowa
Filed Dec. 22, 1958, Ser. No. 782,127
8 Claims. (Cl. 324—43)

This invention relates to a method and means for measuring magnetic fields and, more particularly, the strength and gradients in such fields.

With the increasing use of magnetic fields in research and industry, the inability to accurately characterize these fields has become an even more prominent problem. Although expedients have been employed for this purpose in the past, they have failed to provide the accuracy necessary in such important applications as atomic bombardment devices.

One of the principal characteristics to be ascertained about magnetic fields is the field gradient, i.e., the change in field strength per unit distance. Even though field strengths themselves may be determined fairly accurately in some instances, the magnitude of the values ordinarily encountered and the limited accuracy of the equipment, makes the determination of field gradients from field strengths of questionable value. Further, the devices and expedients currently employed in investigating magnetic fields are bulky yet delicate, precluding their application except under special circumstances and conditions.

It is a principal object of this invention to provide a method and means for characterizing the magnetic fields which overcomes the drawbacks and disadvantages pointed out above. Another object is to provide a method and device for determining the characteristics of gradients in magnetic field strengths. Still another object is to provide a method and means for determining magnetic field strengths themselves. Yet another object is to provide a method and means for characterizing the field strength and strength gradients of a magnetic field through the use of a simple rugged instrument adapted to be readily transported.

A further object is to provide a method and means for determining strength characteristics of magnetic fields by reference to a known field. A still further object is to provide a method and means for characterizing magnetic fields in which the electromotive force (usually abbreviated as E.M.F.) generated by a coil moving in a magnetic field is employed to give an accurate value of the field strength in consistent units. A yet further object is to periodically move a single coil element in an unknown magnetic field and to compare the E.M.F. generated by this movement with the E.M.F. generated by a coil given the same period movement in a field of known strength. Other objects and advantages of this invention can be seen as this specification proceeds.

This invention will be explained in conjunction with the accompanying drawing, in which—

FIG. 1 is a schematic representation of an embodiment of the invention, showing its application in the determination of field strengths and featuring certain electrical circuitry;

FIG. 2 is also a schematic representation of an embodiment of the invention, differing from FIG. 1, however, in featuring mainly the mechanical aspect of a device capable of characterizing magnetic fields;

FIG. 3 is an enlarged fragmentary elevational view of a pivot used in conjunction with the linkage members seen in FIG. 2; and FIG. 4 is a fragmentary transverse sectional view of the pivot seen in FIG. 3.

It is believed that the invention can be best understood when its application to the determination of field strengths themselves is described. For that purpose, the drawing has been constructed so as to present the schematic apparatus of FIG. 1 in the condition in which it would be used to measure field strengths. Referring now to the illustration given, the numerals 10 and 11 designate respectively the north and south poles of a magnet which have a magnetic field 12 therebetween of unknown character. Interposed in the field 12 is a search or probe coil 13 which is electrically coupled by means of conduits 14 and 15 into a reference structure shown within a broken line housing and designated generally by the numeral 16.

Within housing 16 the conduits 14 and 15 from coil 13 are electrically connected to a reference coil 17, seen to be positioned within the poles 18 and 19 of a permanent magnet. The conduit 14 is interrupted at 14a to provide a connection to a "null" indicator which includes an amplifier, attenuator and microammeter, and at 14b where the conduit is connected into a potentiometer 20. Conduit 14 internally of housing 16 also includes a standardizing rheostat 21. Further, conduits 15 and 14 internally of housing 16 are equipped with a reversing switch, as at 22.

The coils 17 and 13 are mechanically coupled together for the same movement by means not shown in FIG. 1, but which are indicated by the broken line connecting the two and designated generally by the numeral 23. Thus, as coil 17 is moved, coil 13 follows the same motion.

In the operation of the device just described, the mechanism 23 gently oscillates coils 13 and 17 in synchronism. The resulting alternating output E.M.F. from the reference coil 17 is applied to the extreme terminals 24 and 25 of potentiometer 20, while the E.M.F. from the search coil 13 is applied to the common or zero terminal 25 and the variable contact 26. By means of the reversing switch 22 in the reference coil circuit, these E.M.F.'s are made to oppose each other. The potentiometer 20, by proper calibration, can be made to read directly in gauss. The proper reading occurs when the two E.M.F.'s balance or nullify each other, and this is achieved when the potentiometer is properly adjusted. The balance of the potentiometer adjustment is observed by means of the null indicator which is connected in series in the search coil circuit. The amplifier greatly amplifies the signal and applies it to a microammeter. The needle of the microammeter swings back and forth in response to the signal unless the latter is made to zero by the potentiometer adjustment.

To achieve a rugged yet accurate portable instrument, I provide the synchronous movement of coils 17 and 13 in the form of small amplitude, slow oscillations. Preferably, the frequency of oscillation is less than 20 cycles per second, and more desirably in the range of 3 cycles per second. The amplitude of movement is of the order of $\frac{1}{30}$ radian. With this frequency of movement, it is possible to use a conventional microammeter in conjunction with an amplifier. Preferably, the amplifier output is attenuated before application to the microammeter in order to limit the full-scale swinging of the ammeter needle and give an indication of approach of the "null" point.

A mechanism 23 for carrying out the simultaneous movement of coils 13 and 17 is depicted in FIG. 2. In FIG. 2, the numeral 27 designates the shaft of a motor or other rotation-providing device, the shaft 27 being mounted for only rotational movement relative to the remainder of the mechanism 23. Affixed to shaft 27 is a disc 28 to which is eccentrically connected an arm 29, as at 30.

The arm 29 is also pivotally connected as at 31 to a lever arm 32. The lever arm 32 has one end fixed against translational movement, being journaled about post 33.

The other end of lever arm 32 is pivotally connected as at 35 to a linkage member 36, linkage member 36 in turn supporting a search coil 37.

Intermediate the ends thereof, lever arm 32 is pivotally connected as at 38 to a link arm 39, the link arm 39 being pivotally connected at its other end as at 40 with a second link arm 41. The end of link 41 remote from link 39 is free to rotate about a fixed post 42 suitably supported between the poles 18 and 19 of a reference magnet. Secured to link 41 so as to rotate with it about post 42 under the influence of motor shaft 27, is the reference coil 17. Secured to the end of lever arm 32 pivotally mounted about post 33 is the search coil 13, shown in dotted line.

In the operation of the foregoing described mechanism, the rotary motion of motor shaft 27 induces a small angular oscillatory movement in both coils 13 and 17, while it produces a reciprocatory movement in coil 37. The coils 13 and 17 rotate with small amplitude about their axes, while coil 37 moves in a translatory motion in its own plane.

By moving coils 13 and 17 in the same period of movement, i.e., the oscillatory motion described, E.M.F.'s are generated in each coil which can be opposed in the electrical circuitry set forth in FIG. 1. To a close approximation, the opposed E.M.F.'s from the reference coil 17 and the search coil 13 are as follows:

(1) $\quad E_R = H_R A_R N_R w_R \sin 2\pi n t$ (2) $\quad E_F = H_F A_F N_F w_F \sin 2\pi n t$ In the foregoing equations, $n$ is the common oscillation frequency, H and AN stand for the fields and area-turns of the coils, and $w_R$ and $w_F$ are their "peak" angular velocities, which depend upon the angular amplitudes and are much less than the nearly constant angular velocity $2\pi n$ of the motor crank. Preferably, the reference magnet having poles 18 and 19 is selected with a sufficiently large field so that, when the potentiometer 20 is balanced, $E_F$ is always a fraction of $E_R$. Writing $E_F$ as the fraction "$f$" of $E_R$, we obtain from Equations 1 and 2:

(3) $\quad H_F = H_R \dfrac{A_R N_R}{A_F N_F} \cdot \dfrac{w_R}{w_F} \cdot f$

All of the factors but the fraction "$f$" being constant, Equation 3 can be rewritten:

(4) $\quad H_F = cr$ in which $r$, which is proportional to $f$, is the reading of the potentiometer 20, and $c$ represents the constant factors. By altering the linkage in the mechanism 23, $w_R/w_F$ may be set at ½, 1, 2, or other ratio advantageous in the design. Through the use of the standardizing rheostat 21, the potentiometer 20 can be calibrated to read directly in gauss. For example, the search coil 13 may be placed in a known field, say of 500 gauss, and the variable contact 26 of potentiometer 20 set precisely midway between end points 24 and 25. The rheostat 21 is then adjusted during simultaneous oscillation of coils 13 and 17 to give a null reading on the null indicator. When this is done, the full-scale range of potentiometer 20 will correspond to 1000 gauss. Alternatively, it is possible to employ a magnet having poles 18 and 19 which develop a known field, and mathematical computation employed in order to derive the field strength in an unknown field being searched by the coil 13. Still another alternative is to employ a solenoid in place of the permanent magnet having poles 18 and 19 as the reference field source. By causing a constant and known current to flow through the solenoid, an ascertainable magnetic field is generated.

The beneficial advantages of the invention can be obtained through the use of only a search coil when means are provided for comparing or evaluating the E.M.F. generated therein by a particular periodic movement. For example, an oscilloscope can be calibrated directly in gauss for a specific coil movement, as from the coil being placed in a known field. Thereafter the coil can be placed in the unknown field and given the same movement to determine either the strength or gradient.

The null indicator schematically represented in the drawing has proven distinctly effective in a portable field testing device. Employing an amplifier and microammeter, it is able to withstand vigorous handling yet provide degrees of accuracy equivalent to the more delicate galvanometers and oscilloscopes. By employing a low frequency of coil movement, i.e., of an order less than 20 c.p.s. and preferably about 3 c.p.s., the microammeter is able to overcome inertia and respond readily to the currents flowing under the generated E.M.F.'s. Accuracy of measurement is implemented by employing small coils moving over small arcs, i.e., a few degrees such as 1/30 radian, thereby avoiding errors brought about by variations in the field within the area searched. The small oscillation, however, is still sufficient to develop a strong enough signal after amplification to deflect the microammeter needle.

The fixed pivot points, as at 33 and 42, may be constructed in accordance with the views seen in FIG. 3 and FIG. 4, so as to provide relatively immobile pivot points, and thus provide a basis for exact synchronism of oscillations in calibrating the mechanism or evaluating the results therefrom.

In FIGS. 3 and 4, post 42 is seen as representative of the fixed type if pivot employed in the apparatus. Pivotally mounted in the bearing plate 41, and shown in fragmentary form, is the pivot post 42. The bearing plate 41 is equipped with a V-shaped opening 43 extending therethrough and in which a portion of post 42 is received. The post is urged into the apex of the V-shaped opening 43 by means of a spring-loaded washer 44 secured to a chassis portion 45 by means of a tension spring 46. The structure just described results in each pivot being constantly pressed into its V-shaped opening so as to eliminate the problem of play due to the usual tolerances found in bearings.

In order to measure a field gradient, the gradient coil 37 is employed instead of the field coil 13. The gradient coil 37 is activated by the same mechanism 23, but because of its connection in the mechanism 23 is given a longitudinal translational movement instead of a rotary oscillation. The gradient coil 37, when placed in a non-uniform magnetic field to which the planes of its turns are perpendicular, and translationally oscillated or otherwise periodically moved at right angles to the field along the field gradient, will enclose a varying magnetic flux. This will give rise to an alternating E.M.F. which can be used to measure the value of the gradient in gauss per unit length. The movement period of the gradient coil 37, being the same as that of the reference coil 17, will generate a similarly shaped voltage. This voltage can be impressed across a portion of potentiometer 20 in the manner described hereinbefore, and the null indicator employed to indicate when the gradient voltage and the reference voltage cancel each other. In this operation, the reference coil may be oscillated as before through the same small arc at low frequency, so that here it is possible to measure field gradients without having a known field gradient as a reference, merely a reference field. For that matter, once the mechanism within housing 16 is calibrated, it is not necessary even to know the characteristics of the reference field, although that would be immediately apparent by a simple calculation.

In the operation of the device described in the measurement of field gradients, the amplitude of movement or reciprocation of the gradient coil 37 is, in practice, 1 or 2 millimeters. The output of the gradient search coil is given by the following equation:

(5) $\quad E_G = A_G N_G \dfrac{dH}{dt}$

Introducing into the differential the factor z of the direction of the gradient, Equation 5 becomes:

$$(6) \quad E_G = A_G N_G \frac{dH}{dz} \cdot \frac{dz}{dt}$$

However, $$\frac{dz}{dt} = w_F l \sin 2\pi nt$$

where $l$ is the length of the arm 32, so Equation 6 becomes:

$$(7) \quad E_G = A_G N_G \frac{dH}{dz} wl \sin 2\pi nt$$

With the potentiometer 20 balanced, $E_G = f' E_R$, where $f'$ is again a fraction proportional to the potentiometer reading $r'$, and thus by combining Equations 1 and 7, Equation 8 follows:

$$(8) \quad \frac{dH}{dz} = H_R \frac{A_R N_R}{A_G N_G} \cdot \frac{w_R}{w_F l} f'$$

This can be converted to:

$$(9) \quad \frac{dH}{dz} = \frac{c' r'}{l}$$

In the equation just above, $c'$ represents a combination of all the constants in the equation, and $r'$ is the potentiometer reading.

The invention finds particular application in those instances where currently available techniques have been found inadequate to provide any indication at all of field gradients. Even with complex and delicate machines, it is only possible to measure field strengths with limited accuracy, say of the order of about plus or minus 1%. Where the field strength is of the order of 20,000 gauss at one point, and it may vary to 20,005 gauss over a distance of 1 centimeter, the present devices are too insensitive to detect this variation. However, this variation may be significant in the operation of many electronic devices. Such a small percentage change in large fields can be readily detected, according to the teachings of this invention. Still further, it is now possible to construct profiles of field strengths with far greater accuracy by first determining the field gradients at a number of points and thereafter integrating the field function thus established.

In the practice of the invention, the shape and character of the various coils may be changed to meet specific installation requirements. Where, for example, the field strength is known to be uniform in one plane but unknown in another, the coil can be constructed appropriately so as to take advantage of the known factor and use a larger number of turns in one portion. The number of turns may be varied, as well as the geometry of the coil, while still retaining the advantages stemming from the use of a single coil element.

Particularly in the measuring of field gradients, the invention provides reliable and conveniently arrived-at results. The single search coil or other inductive element provides a precise voltage the shape of which is, in effect, mechanically determined by essentially simple, rugged equipment. Merely by faithfully duplicating the period of movement in the search coil, an E.M.F. is generated that can be evaluated in magnetic terms by simple electrical equipment. Thus, the invention combines both simple electrical and mechanical equipment to provide a heretofore unachievable accuracy.

While in the foregoing specification a detailed description of an embodiment of the invention has been set forth in considerable detail for the purpose of explanation, various changes the in details thereof will be apparent to those skilled in the art without departing from the spirit and scope of the invention.

I claim:
1. In apparatus for determining magnetic field strengths and gradients, a reference coil mechanically coupled to motor means, a search coil mechanically coupled to said motor means, linkage means interposed between said search coil and said motor means for moving said search coil in a reciprocatory fashion and between said reference coil and motor means for moving said reference coil in an oscillatory fashion, both of said search coil and reference coil being electrically coupled to E.M.F. comparing means.

2. In apparatus for determining magnetic field strengths and gradients, a reference coil mechanically coupled to motor means, a search coil mechanically coupled to said motor means, linkage means interposed between said search coil and said motor means for moving said search coil in a reciprocatory fashion and between said reference coil, and motor means for moving said reference coil in an oscillatory fashion, both of said search coil and reference coil being electrically coupled to E.M.F. comparing means, said comparing means including adjustable means for opposing the voltages generated in the reference coil and search coil, and means for detecting the null point.

3. In apparatus for determining magnetic field strengths and gradients, a reference coil mechanically coupled to motor means, a search coil mechanically coupled to said motor means, linkage means interposed between said search coil and said motor means for moving said search coil in a reciprocatory fashion and between said reference coil, and motor means for moving said reference coil in an oscillatory fashion, both of said search coil and reference coil being electrically coupled to E.M.F. comparing means, said comparing means including adjustable means for opposing the voltages generated in the reference coil and search coil, and means for detecting the null point, the said null point-detecting means including an amplifier and a microammeter, the said motor means being effective to oscillate said reference coil at a frequency less than 20 cycles per second and with an amplitude of movement of about ⅟₃₀ radian.

4. In apparatus for determining magnetic field strengths and gradients, a reference coil mechanically coupled to motor means, a search coil mechanically coupled to said motor means, linkage means interposed between said search coil and said motor means for moving said search coil in a reciprocatory fashion and between said reference coil, and motor means for moving said reference coil in an oscillatory fashion, said linkage means including pivoted bearings, each bearing comprising a cylindrical post resiliently urged into a V-shaped recess, both of said search coil and reference coil being electrically coupled to E.M.F. comparing means.

5. In apparatus for determining magnetic field gradients, a reference coil, a search coil, means for moving said search coil in a reciprocatory fashion and for moving said reference coil in an oscillatory fashion, both of said search coil and reference coil being electrically coupled to E.M.F. comparing means.

6. In apparatus for determining magnetic field gradients, a reference coil, a search coil, means for moving said search coil in a reciprocatory fashion and for moving said reference coil in an oscillatory fashion, both of said search coil and reference coil being electrically coupled to E.M.F. comparing means, said comparing means including means for opposing the voltages generated in the reference and search coils, and means for detecting the null point.

7. In apparatus for determining magnetic field gradients, a reference coil, a search coil, means for moving said search coil in a reciprocatory fashion and for moving said reference coil in an oscillatory fashion, both of said search coil and reference coil being electrically coupled to E.M.F. comparing means, said comparing means including means for opposing the voltages generated in the reference and search coils, and means for detecting the null point, said moving means being effective to oscillate said reference coil at a frequency less than 20 cycles per second and with an amplitude of movement of about 1/30 radian.

8. In apparatus for determining magnetic field strengths and gradients, a planar reference coil, a search coil, means for moving said search coil in a reciprocatory fashion in its own plane and for simultaneously moving said reference coil in an oscillatory fashion with the movement periods of the two coils being the same, both of said search coil and reference coil being electrically coupled to E.M.F. comparing means, said comparing means including adjustable means for opposing the voltages generated in the reference coil and search coil, and means for detecting the null point.

References Cited in the file of this patent

UNITED STATES PATENTS

| | | |
|---|---|---|
| 2,519,094 | Zuschlag | Aug. 15, 1950 |
| 2,530,176 | Powell | Nov. 14, 1950 |
| 2,624,783 | Nedzel | Jan. 6, 1953 |
| 2,776,404 | Caldecourt | Jan. 1, 1957 |

OTHER REFERENCES

Langer et al.: The Review of Scientific Instruments, vol. 21, No. 6, June 1950, pages 522 and 523.

Frazer et al.: The Review of Scientific Instruments, vol. 26, No. 5, May 1955, pages 475 and 476.